June 16, 1925.  
R. M. GRUSS  
1,541,943  
SHOCK ABSORBER  
Filed May 24, 1923  
2 Sheets-Sheet 2
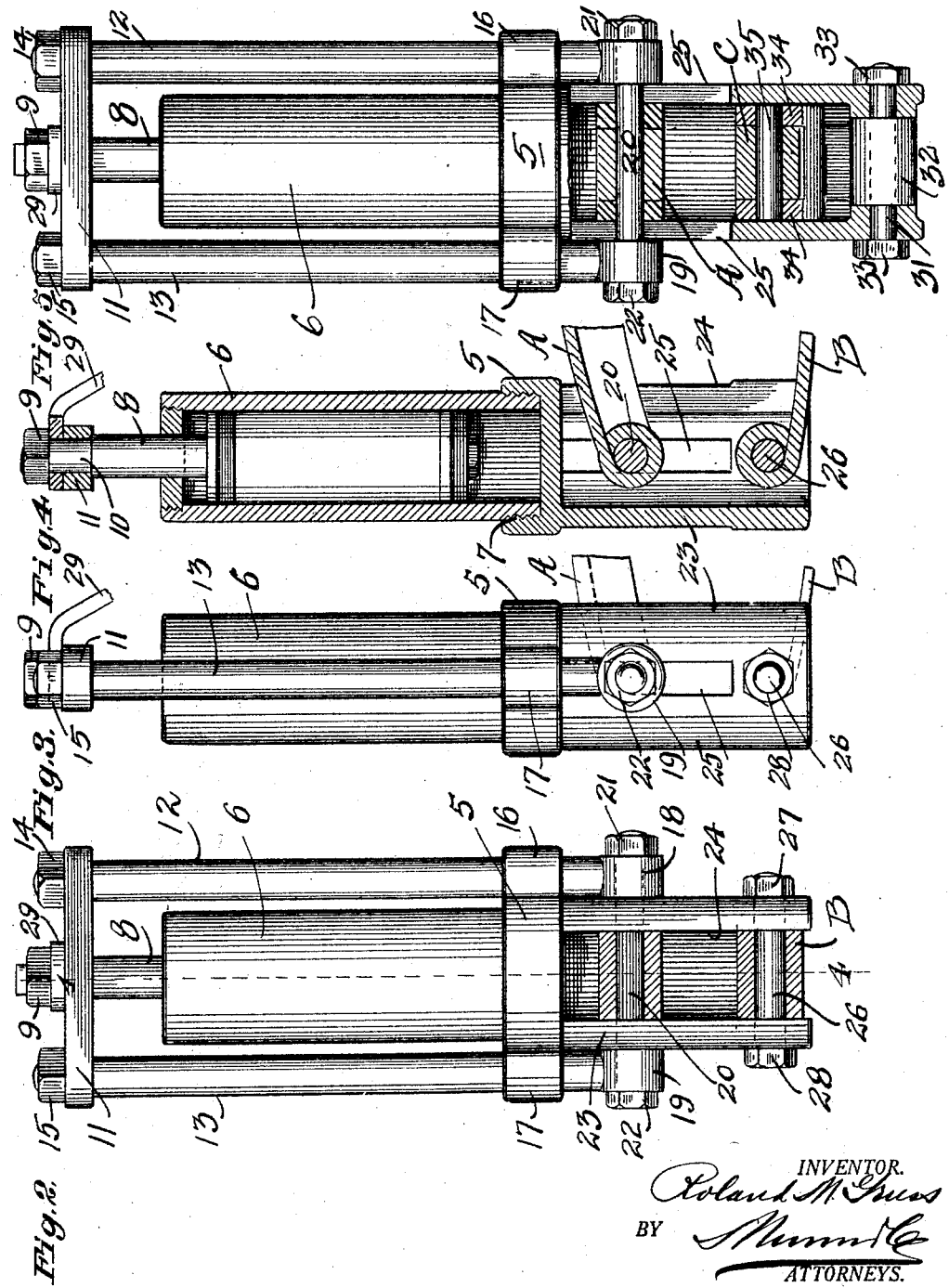

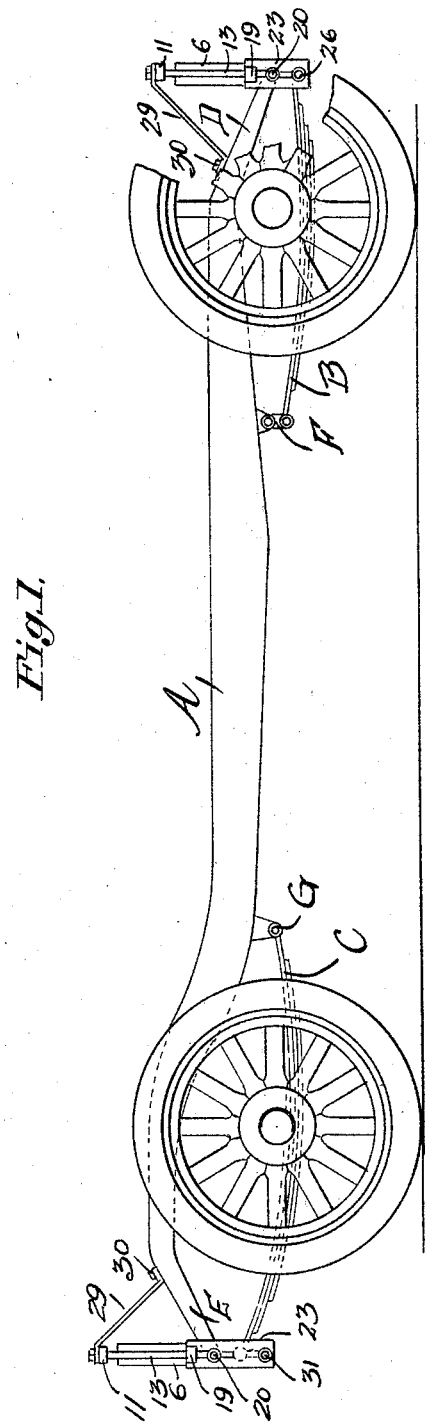

Patented June 16, 1925.

1,541,943

UNITED STATES PATENT OFFICE.

ROLAND M. GRUSS, OF SAN FRANCISCO, CALIFORNIA.

SHOCK ABSORBER.

Application filed May 24, 1923. Serial No. 641,228.

*To all whom it may concern:*

Be it known that I, ROLAND M. GRUSS, a citizen of the United States, and a resident of San Francisco, county of San Francisco, State of California, have invented a new and useful Shock Absorber, of which the following is a specification.

My invention relates in general to shock absorbers for use on road vehicles and has reference more particularly to an improved suspension for such devices. The primary object of my invention is to provide a suspension or mounting for shock absorbers to be utilized to the best advantage in obtaining maximum efficiency.

A further object of the invention is to produce a suspension or mounting for shock absorbers which will offer a rugged and durable mounting assembly and overcome the possibility of breakage of parts and other undesirable conditions which take away from the operating efficiency of the assembly.

A still further object of the invention is to provide a mounting or suspension for shock absorbers which will accommodate various conventional types of shock absorbers so that they may be applied to standard makes of road vehicles without special facilities for making the connections or otherwise departing from the usual existing structure of the vehicle.

The invention possesses further objects and features which will appear as the description now proceeds with reference to the illustrative embodiment of the invention, in which Figure 1 is a view in side elevation of a model chassis showing the application of the invention; Figure 2 is a view in end elevation of a shock absorber equipped with the suspension or mounting and with parts of the mounting shown in section; Figure 3 is a view inside elevation of a shock absorber equipped with the mounting or suspension; Figure 4 is a vertical section on the line 4—4 of Figure 2, and Figure 5 is a view in end elevation and partly in section of a slightly modified form which may be used for the rear spring structure of the vehicle.

Referring now to the drawings in detail A represents a frame member of a road vehicle chassis, B the front spring and C the rear spring. As is customary in standard types of vehicle productions, the frame members A of the chassis terminate in front and rear outwardly projecting and downwardly presented ends D and E respectively. These ends provide suspending means for the ends of the springs B and C, the connection usually being made by a shackle, which of course is done away with in equipping the spring suspension with my invention. The opposite ends of the springs B and C are connected to the frames A as at F and G.

Shock absorbers of that type known to the trade as "air springs" are usually attached to the spring suspension at the point of connection between the extreme ends D and E of the frame members A and the outer ends of the springs B and C, the connections being made by substituting various types of connections for the existing shackle structure.

In my assembly I desire to accomplish several important results: first of all, is to obtain maximum functioning efficiency of the shock absorber as well as providing an unusually rugged and durable structure. With this end in view I propose to provide a base (5) which may be made in any convenient way to receive a cylinder (6) of the shock absorber, and in the present illustration I have shown the lower end of the cylinder threaded as at (7) into the collar like form of the base (5). This supports the cylinder (6) in a vertical position so that the piston therein is free to reciprocate within the cylinder with the reciprocation effected through the pison rod (8) which projects through the top of the cylinder as is customary. The particular construction of the shock absorber is immaterial so far as the suspension or mounting is concerned, since the mounting or suspension may be used on various types of devices. Of course they would usually include a cylinder, a piston and a piston rod. Usually in equipping a vehicle with a shock absorber one part of the spring suspension, say for instance the spring C, is connected to the cylinder and the other part of the spring suspension, say for instance the end of the frame members A, are connected to the piston by some suitable connection with the piston rod. In my particular assembly the same principle is carried out but in an improved way. For instance, the piston rod (8) terminates preferably in a threaded end to receive a nut (9) and a portion (10) reduced in diameter to receive the cross head (11) with the same confined on the piston rod by the nut (9) and the shoulder made at the beginning of the reduced portion (10). The cross head (11) extends transversely of the shock absorber with the extremities of the same made with openings adapted to receive the reduced ends of the vertical rods (12) and (13) with the ends of the rods projecting through the openings in the cross head and threaded so as to receive nuts (14) and (15) for maintaining the connection. The rods (12) and (13) extend downwardly on diametrically opposite sides of the shock absorber through guides (16) and (17) provided on opposite sides of the base (5) and with the ends of the rods terminating in trunnion bearings (18) and (19). These trunnion bearings (18) and (19) are made to receive the ends of a pin (20) with nuts (21) and (22) threaded on the ends of the pin.

The downwardly presented skirt (23) of the base (5) is cylindrical in shape but also includes an opening (24) in one side thereof to receive the ends of the frame member A and the end of the spring C. The skirt (23) is further provided with vertical slots (25) in diametrically opposite sides of the same and through which the pin (20) extends with freedom of reciprocation.

The pin (20) provides a connection for the ends of the frame members A and is presented in the hollow or the skirt (23) through the opening (24) and the existing eye of the same receives a pin (20) so that the members A may be fixed to the rods (12) and (13) and through them connected to the piston rod (8). This assembly indirectly connects the members A to the piston of the shock absorber.

The lower termination of the skirt (23) is equipped with openings on diametrically opposite sides to receive a pin (26) which extends through the skirt with nuts (27) and (28) threaded on its respective ends. This pin (26) provides a connection for the eye of the spring C and the assembly connects the spring C in this manner directly to the skirt (23) and indirectly to the cylinder (6) of the shock absorber.

From the above it will be thus seen that the frame members A of the vehicle are connected to the piston and the springs to the cylinder. When the shock absorber functions the relative movement between the frame members A and the springs will be transmitted to the shock absorber and when these parts of the spring suspension move away from each other the piston will be thrust up and the cylinder pulled down, and on the rebound the cylinder will be thrust up and the piston pulled down and in both instances the shock absorbing qualities of the shock absorber may be realized.

Since the suspension or mounting is of an improved type as compared to heretofore known devices, the shock absorber will operate to a maximum efficiency. In other words where the shock absorber would not ordinarily function with any degree of satisfaction when the vehicle went over a slightly uneven road surface, with this particular mounting no matter how slight a shock is encountered, my improved mounting will transmit the same to the shock absorber so that it may be absorbed. The efficient way in which the shock absorber operates when equipped with my suspension and mounting is due to some extent to the increased leverage effect which is realized by the rods (12) and (13) and the cross head (11). Then again the alining of the parts can be so easily accomplished with my mounting that an undue amount of friction is eliminated.

As a means of bracing the structure I propose to use an angle iron or the like (29), which may be secured between the cross head (11) and the nut (9) on the piston rod (8) and extended down and secured as at (30) to the top of the frame member A of the vehicle.

Due to the increased relative movement of the spring suspension in the rear, I find that it will be necessary to slightly modify the connection for the rear springs C, although in this slight change I do not depart from the principle of the device. Instead of connecting the rear springs C to the pin (26), as in the front spring structure, I make the skirt (23) longer and use a pin (31) which is passed through a collar (32) and secured in the skirt by nuts (33). The collar (32) has a link part which extends upwardly in the skirt and terminates in a bifurcated end (34) which includes openings in the opposite sides made to receive a pin (35) for securing the eye of the spring C in the bifurcation. This link directly connects the spring C with the skirt (23) but suspends the same so to speak with freedom of rocking motion within the hollow of the skirt so that the relative movement of the frame and the spring, when the vehicle encounters a severe jolt, will leave these parts with an increased freedom of movement as compared to the front asembly; and as stated with the front assembly, this additional freedom of movement is not necessary.

The other part of the assembly, so far as concerns the rear of the vehicle, is the same as described with reference to the front assembly.

I claim:

1. A shock absorber comprising a cylinder adapted for positioning vertically adjacent the frame and spring ends of an automobile, a piston within the cylinder with a piston rod extending through the upper end thereof, a base member secured to the lower end of the cylinder and having a cylindrical skirt depending therefrom having a side opening adapted to receive the spring end for pivotal connection to the skirt and also the frame end, a pin extending through slots in opposite sides of the skirt and said frame end, and a pair of rods extending vertically along opposite sides of the cylinder connected at their lower ends respectively to the ends of the pin and connected at their upper ends to the piston rod by a cross head.

2. A shock absorber as described in claim 1 having an angular brace extending from the upper end of the piston rod to the frame of the vehicle.

3. In combination with an automobile, a shock absorber of the character described comprising a cylinder with a piston therein having a rod extending out of one end of the cylinder, the rod being rigidly braced to the automobile frame, the cylinder pivotally secured to the end of the automobile road spring and guided by the frame for parallel movement over the piston.

ROLAND M. GRUSS.